2,806,003
Patented Sept. 10, 1957

2,806,003

METHOD FOR CONVERTING INTO METHANE THE HYDROCARBONS CONTAINED IN GASIFORM MIXTURES INTENDED MORE PARTICULARLY FOR THE SYNTHETIC PRODUCTION OF AMMONIA

Jean Robert Housset, Sotteville-les-Rouen, and Marcel Charles Victor Jean, Paris, France, assignors to Societe Chimique de la Grande Paroisse Azote et Produits Chimiques, Paris, France, a corporation of France No Drawing. Application April 21, 1953, Serial No. 350,206

Claims priority, application France July 12, 1952

9 Claims. (Cl. 252—376)

The catalysts serving for the synthetic production of ammonia are generally constituted by metal masses having as a base iron produced by the reduction of ferro-ferric oxide $Fe_3O_4$ and containing variable amounts of auxiliary substances. It is a known fact that such catalysts are very sensitive to the action of various poisons.

Experience shows in particular that the carbon produced by the destruction of hydrocarbons higher than methane are capable of considerably inhibiting the activity of such catalysts.

This inhibiting action is all the more marked when the contents of hydrocarbons in the mixture $N_2+3H_2$ are higher and when these hydrocarbons are less stable against a rise in temperature.

It has already been proposed, in the cases where the hydrogen or mixtures containing large amounts of hydrogen, available for the synthesis of ammonia, are admixed with small amounts of higher hydrocarbons that are thermally not stable, to resort to a very simple procedure for the purification of such a mixture, said procedure consisting in submitting said hydrogen or mixture to the action of a hydrogenizing catalyst adapted to produce a transformation such as

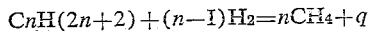

$$C_nH(2n+2) + (n-1)H_2 = nCH_4 + q$$

calories, said transformation converting into thermally stable methane which does not affect objectionably the synthesis of ammonia, the higher hydrocarbons that are liable to form carbon and to poison the catalysts having as a base reduced iron. The preceding relationship shows that the transformation into methane of saturated hydrocarbons is executed without any modification in volume and should not in principle be sensitive to the action of pressure. This has led to the idea that this reaction may be advantageously executed at the actual pressure at which the synthesis of ammonia is performed.

It has thus been suggested to provide the conversion into methane of the hydrocarbons inside the purifying vessel containing an iron type catalyst, that forms part of certain plants producing synthetic ammonia according to the Claude method. Under standard conditions, there is produced therein, under a pressure of synthesis ranging between 700 and 1000 atmospheres, the conversion of CO through hydrogenation into $CH_4+H_2O$ together with the removal of small amounts of oxygen. Now it has been found that if the gas contains small amount of higher hydrocarbons, propane or ethane for instance, the conversion of these hydrocarbons into methane remain incomplete even at temperatures of the order of 500° C. Consequently, the catalysing vessel providing for the synthesis of ammonia beyond such a purifying vessel fed with an incompletely purified gas containing still a substantial amount of hydrocarbons higher than methane, provides transformation conditions for the production of $NH_3$ that are much less favorable than in the case of a gas that is completely devoid of such hydrocarbons.

A rise in temperature to about 600° C. increases the rate of conversion into methane and it is possible to transform then about 70% of the higher hydrocarbons present in the mixture; however, these thermic conditions are too high while the result obtained is still incomplete.

If, instead of a catalyst with an iron basis, a catalyst with a nickel basis is used, the rate of conversion into methane is still less favorable for similar heat conditions. Our invention has for its object to cut out these drawbacks and to produce a practically complete conversion into methane of the hydrocarbons contained inside the mixture to be heated, which allows executing the synthesis of ammonia, starting from such a mixture, under the best conditions possible.

Our invention relies on the surprising discovery made as a consequence of our experiments and according to which the conversion into methane of the higher hydrocarbons is practically complete at temperatures of the order of 450° C. even at comparatively high volumetric speeds, when the hydrogenization is executed no longer under the very high pressures corresponding to the synthesis of ammonia but at substantially atmospheric pressure or the like comparatively low pressures reaching 20 or 30 atmospheres or even more, while remaining in all cases far underneath the pressures that are usually resorted to for the synthesis of ammonia (200 to 1000 atmospheres).

Our invention consists primarily in proceeding with the conversion into methane under comparatively low pressures as defined hereinabove. The best results are obtained by resorting to a nickel catalyst carried by a support such as kieselguhr, bentonite, alumina or preferably absorbent silica gel.

Thus, at temperatures ranging between 420 and 450° C. and under a pressure of 10 atmospheres, we have obtained the complete conversion of propane into methane by sending a gas having the composition $N_2+3H_2$ containing 0.5% of $C_3H_8$, at the rate of 25,000 volumes per hour measured at 0° C. under 760 mm. Hg, over a catalyst having a nickel base and carried by silica gel.

At a temperature of 350° C. and with an output of 600 volumes per hour, it is possible to convert more than 50% of the propane. The same complete conversion into methane is obtained at 120–150° C. with gaseous mixtures that contain much more higher hydrocarbons, say 5 or 10% of $C_3H_8$, without any traces of carbon black forming; if, instead of being formed solely by saturated hydrocarbons, the impurities accompanying the mixture $N_2+3H_2$ were to contain also ethylenic or the like hydrocarbons in substantial amounts, say for instance 25 to 30% of olefines, the same perfectly satisfactory result may be obtained; it is however preferable in such a case to substantially reduce the throughput down to say 5,000 volumes per hour for a mixture $N_2+3H_2$ containing 1% of $C_3H_8$ and 0.5% of $C_3H_6$.

The amount of heat evolved during the conversion of hydrocarbons into methane is low and is not generally sufficient for holding the catalyst at reaction temperature. The constancy of favorable conditions may then be obtained according to our invention by associating a more strongly exothermic reaction with the conversion into methane. For instance, the methanisation may be executed in contact with a catalyst housed inside tubes outside which is performed a gradual catalytic combustion adapted to keep up a temperature of about 400 to 450° C.

It has been found that it is possible to execute simultaneously the conversion into methane and the exothermic reaction producing the necessary additional heat required for a self-supporting reaction, in contact with a same catalyst. According to our invention this idea is resorted to in order to produce the desired additional nitrogen, for instance through oxidizing flue gases containing still a small percentage of oxygen but previously freed of any $CO_2$. If the flue gases have variable contents of oxygen, we use a heat exchanger provided with a by-pass allowing adjustment of temperature. Under such conditions, the temperature in the catalyst may be held at a constant level of the order of 400 to 450° C., which is sufficient for the complete removal of oxygen and for the conversion of higher paraffin hydrocarbons into methane without said temperature being too high, whereby any reaction of steam on the hydrocarbons that are being converted is substantially cut out.

As we cut out the formation of $CO_2$ and of CO, we obtain in a particularly economical manner a gasiform mixture of nitrogen and hydrogen in which the hydrocarbons previously extant have been converted into methane, the presence of which methane does not detrimentally affect the execution of the synthesis of ammonia.

We have described hereinafter by way of example and by no means in a limiting sense, an embodiment of a method for producing according to our invention a mixture intended for the synthesis of ammonia, which method starts from a raw material constituted by a gas rich in hydrogen and produced through the catalytic conversion into aromatics of a petroleum oil product.

Said gas, when cooled down to —100° C. under a pressure of the order of 25 atmospheres, contains still, in addition to a small amount of methane, about 0.6% of ethane and 0.1 to 0.2% of propane, which latter make the gas hardly fit for synthesis through contact with the iron base catalyst generally used for the production of ammonia as disclosed hereinabove.

Now we may operate as follows in accordance with our invention for an hourly production of 4,530 kg. of ammonia; we compress under a pressure of 25 kg. per sq. cm. an output of 4,140 cubic meters per hour of industrial flue gas containing about 2.5% of free $O_2$ and we submit them to a treatment for the complete removal of carbonic gas, by means of a plentiful washing first with water and then with caustic soda in the usual manner with a view to obtaining an output of 3500 cubic meters per hour of flue gas containing no carbonic gas and constituted approximately by 100 cb. m. of oxygen, 3362 cb. m. of nitrogen and 38 cb. m. of argon.

We then mix said gas with an output of 10,630 cb. m. per hour of a hydrogen-containing mixture produced as disclosed hereinabove. This hydrogen-containing mixture is constituted by

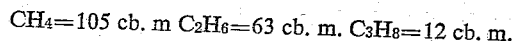
$CH_4 = 105$ cb. m $C_2H_6 = 63$ cb. m. $C_3H_8 = 12$ cb. m.

and $H_2 = 10,450$ cb. m.

The mixture of hydrogen and purified flue gas deprived of their carbonic gas is then fed into a heat exchanger provided with an adjustable by-pass and this heat-exchanger which absorbs the heat evolved during the catalytic purification and which operates under countercurrent conditions, brings the temperature of the mixture to about 350° C., at which temperature it enters the catalyzing chamber containing 600 litres of a catalyst. The latter is obtained through an impregnation of particles measuring about 3 to 15 mm. of silica gel by a concentrated solution of nickel nitrate whereby after calcination, the granular silica gel carrier contains about 5% of the oxide NiO. This nickel oxide is easily reduced by hydrogen at a temperature lower than 450° C. so as to obtain a sufficient demethylating action as well known in the art.

When in contact with the reduced nickel brought to said temperature of 350° C., the oxygen contained in the gasiform mixture disappears speedily and at the same time the temperature of the mixture remains stationary at about 440 to 450° C. while the higher hydrocarbons are converted into methane.

At the output from the catalyzing chamber, the treated gas abandons its heat, first inside the heat exchanger, operating under counter-current conditions, referred to hereinabove and then inside a condenser in which the steam formed is condensed; it is then found that the gasiform mixture output of which is equal to 13,729 cb. m. per hour contains 260 cb. m. of methane, 38 cb. m. or argon, 10,059 cb. m. of hydrogen and 3362 cb. m. of nitrogen and that it is quite fit for conversion into $NH_3$ by reason of its complete absence of oxygen and of the fact that it does not contain more than 10 millionths of $CO_2$, 7 millionths of CO and less than 5 millionths of hydrocarbons having two, three and more atoms of carbon in their molecules.

This arrangement allows thus, through the passage over a single purifying catalyst remaining in self-sustaining reaction conditions at a suitable uniform temperature of the order of 450° C., obtaining together the removal of the oxygen from the flue gases and the conversion into methane of the objectionable hydrocarbons without any formation of carbon dioxide. In other words, it is possible to obtain with a very low consumption of hydrogen a mixture of nitrogen and hydrogen suitable for the synthesis of 4,530 kg. per hour of ammonia.

Instead of industrial flue gases, we may obviously use gases that are rich in nitrogen and are slightly oxidizing, which gases are constituted by air or evolved e. g. at the end of operation in plants absorbing nitrous vapors e. g. at the end of operation in plants absorbing nitrous vapours or the like residuary gases.

Obviously, many modifications may be brought to the method disclosed hereinabove without unduly widening the scope of our invention as defined in the accompanying claims.

What we claim is:

1. In the preparation of mixtures, intended for the synthesis of ammonia under a very high pressure, the steps of purifying mixtures constituted by a large body of nitrogen and hydrogen admixed with a small amount of methane and other paraffinic hydrocarbons which are gaseous at room temperature and atmospheric pressure, said steps consisting in subjecting the mixture to a complete demethylating treatment adapted to convert into methane the other hydrocarbons in the presence of a highly reactive nickel catalyst at a temperature not substantially higher than about 450° C. and under a pressure ranging between about 1 and 100 atmospheres and clearly lower than the pressure required for the synthesis of ammonia.

2. In the preparation of mixtures, intended for the synthesis of ammonia under a very high pressure, the step of purifying mixtures constituted by a large body of nitrogen and hydrogen admixed with a small amount of methane and other paraffinic hydrocarbons which are gaseous at room temperature and atmospheric pressure, said step consisting in subjecting the mixture to a catalytic complete demethylating treatment adapted to convert into methane the other hydrocarbons in the presence of a highly reactive nickel catalyst prepared through the reduction of nickel oxide by hydrogen at a temperature lower than 450° C.; said conversion being operated at a temperature not substantially higher than about 450° C. and under a pressure ranging between about 1 and 100 atmospheres and clearly lower than the pressure required for the synthesis of ammonia.

3. In the synthesis of ammonia through reaction between nitrogen and hydrogen admixed with small amounts of methane and other non-aromatic hydrocarbons which are gaseous at room temperature and pressure, the step consisting in making said mixture flow at a high volumetric rate over a highly reactive nickel catalyst to demethylate completely said other hydrocarbons through a catalytic treatment at a temperature not substantially higher than about 450° C. and under a pressure ranging between about 1 and 100 atmospheres and clearly lower than the pressure required for the synthesis of ammonia.

4. In the synthesis of ammonia through reaction between nitrogen and hydrogen admixed with small amounts of methane and other non-aromatic hydrocarbons which are gaseous at room temperature and pressure, the steps consisting in adding to the mixture a further gasiform mixture containing small amounts of oxygen and devoid of $CO_2$ together with larger amounts of nitrogen in amounts such as will bring the total proportion of nitrogen with reference to the hydrogen in the first mixture to a value corresponding to the proportions of nitrogen and hydrogen in ammonia, making the mixture obtained flow at a high volumetric rate over a highly reactive nickel catalyst while maintaining the maximum temperature of the catalyst underneath about 450° C. and the pressure at a value ranging between about 1 and 100 atmospheres and clearly lower than the pressure required for the synthesis of ammonia.

5. In the synthesis of ammonia through reaction between nitrogen and hydrogen admixed with small amounts of methane and other non-aromatic hydrocarbons which are gaseous at room temperature and pressure, the steps consisting in adding to the mixture a further gasiform mixture containing small amounts of oxygen and devoid of $CO_2$ together with larger amounts of nitrogen in amounts such as will bring the total proportion of nitrogen with reference to the hydrogen in the first mixture to a value corresponding to the proportions of nitrogen and hydrogen in ammonia, making the mixture obtained flow at a high volumetric rate over a highly reactive nickel catalyst prepared through the reduction of nickel oxide by hydrogen at a temperature lower than 450° C., maintaining the maximum temperature of the catalyst underneath about 450° C. and the pressure at a value ranging between about 1 and 100 atmospheres and clearly lower than the pressure required for the synthesis of ammonia and treating the purified mixture thus obtained containing no carbon monoxide and no carbon dioxide under high pressure to produce ammonia.

6. In the preparation of mixtures, intended for the synthesis of ammonia under a very high pressure, the step of purifying mixtures constituted by a large body of nitrogen and hydrogen admixed with a small amount of methane and other paraffinic hydrocarbons which are gaseous at room temperature and atmospheric pressure, said step consisting in subjecting the mixture to a catalytic complete demethylating treatment adapted to convert into methane the other hydrocarbons in the presence of a highly reactive nickel catalyst prepared through the reduction of nickel oxide by hydrogen at a temperature lower than 450° C., said conversion being operated at a temperature not substantially higher than about 450° C. and under a pressure ranging between about 1 and 30 atmospheres and clearly lower than the pressure required for the synthesis of ammonia.

7. In the preparation of mixtures, intended for the synthesis of ammonia under a very high pressure, the steps of purifying mixtures constituted by a large body of nitrogen and hydrogen admixed with a small amount of methane and other paraffinic hydrocarbons which are gaseous at room temperature and atmospheric pressure, said steps consisting in subjecting the mixture to a catalytic complete demethylating treatment adapted to convert into methane the other hydrocarbons in the presence of a highly reactive nickel catalyst at a temperature not substantially higher than about 450° C. and under a pressure ranging between about 1 and 100 atmospheres and clearly lower than the pressure required for the synthesis of ammonia, associating with said conversion treatment an exothermic treatment adapted to raise the temperature and maintaining the latter between about 400 and 450° C.

8. In the preparation of mixtures, intended for the synthesis of ammonia under a very high pressure, the steps of purifying mixtures constituted by a large body of nitrogen and hydrogen admixed with a small amount of methane and other paraffinic hydrocarbons which are gaseous at room temperature and atmospheric pressure, said steps consisting in admixing the mixture with flue gases containing small amounts of oxygen, devoid of carbon dioxide and containing amounts of nitrogen such as will bring the proportion by volume of hydrogen to nitrogen to a value of about 3:1 and subjecting the mixture to a complete demethylating treatment adapted to convert into methane the other hydrocarbons in the presence of a highly reactive nickel catalyst, while maintaining the temperature between about 400 and 450° C., and under a pressure clearly lower than the pressure required for the synthesis of ammonia.

9. In the preparation of mixtures, intended for the synthesis of ammonia under a very high pressure, the steps of purifying mixtures constituted by a large body of nitrogen admixed with a small amount of methane and other paraffinic hydrocarbons which are gaseous at room temperature and atmospheric pressure, said steps consisting in admixing the mixture with a mixture containing oxygen with a large body of nitrogen and devoid of carbon oxides and subjecting the mixture to a complete demethylating treatment adapted to convert into methane the other hydrocarbons in the presence of a highly reactive nickel catalyst while maintaining the temperature between about 400 and 450° C. and under a pressure clearly lower than the pressure required for the synthesis of ammonia.

References Cited in the file of this patent

UNITED STATES PATENTS

| 1,698,722 | Henderson | Jan. 15, 1929 |
| 2,029,786 | Myddleton | Feb. 4, 1936 |
| 2,048,668 | Baensch | July 28, 1936 |
| 2,112,643 | Baensch et al. | Mar. 29, 1938 |
| 2,422,671 | Haensel | June 24, 1947 |
| 2,433,072 | Stewart et al. | Dec. 23, 1947 |
| 2,525,354 | Hoog et al. | Oct. 10, 1950 |
| 2,560,433 | Gilbert et al. | July 10, 1951 |
| 2,581,228 | Bailey et al. | Jan. 1, 1952 |
| 2,606,940 | Bailey et al. | Aug. 12, 1952 |

FOREIGN PATENTS

| 292,615 | Germany | Oct. 28, 1916 |

OTHER REFERENCES

"Catalysis" by Berkman et al., published by Reinhold Publishing Corp., 330 W. 42 St. N. Y. USA, 1940, pages 345, 561 and 682.